United States Patent

Sunagawa

(10) Patent No.: US 10,044,891 B2
(45) Date of Patent: Aug. 7, 2018

(54) ELECTRONIC APPARATUS, RECOVERY METHOD, AND COMPUTER-READABLE RECORDING MEDIUM

(71) Applicant: Yuki Sunagawa, Kanagawa (JP)

(72) Inventor: Yuki Sunagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/450,645

(22) Filed: Mar. 6, 2017

(65) Prior Publication Data

US 2017/0264767 A1 Sep. 14, 2017

(30) Foreign Application Priority Data

Mar. 9, 2016 (JP) ................................. 2016-045868

(51) Int. Cl.
*G06K 15/00* (2006.01)
*H04N 1/00* (2006.01)
*H04N 1/32* (2006.01)

(52) U.S. Cl.
CPC ....... *H04N 1/00891* (2013.01); *H04N 1/0083* (2013.01); *H04N 1/00904* (2013.01); *H04N 1/32625* (2013.01); *H04N 1/32667* (2013.01); *H04N 1/32694* (2013.01); *H04N 2201/0093* (2013.01); *H04N 2201/0094* (2013.01)

(58) Field of Classification Search
CPC ............. H04N 1/00891; H04N 1/0083; H04N 1/32625; H04N 1/00904; H04N 1/32694; H04N 1/32667; H04N 2201/0093; H04N 2201/0094

USPC ........................................................ 358/1.14
See application file for complete search history.

(56) References Cited

U.S. PATENT DOCUMENTS

| 7,982,889 | B2 * | 7/2011 | Okada | ................ G03G 15/5004 358/1.1 |
| 2005/0179931 | A1 | 8/2005 | Yamaguchi et al. | |
| 2007/0277048 | A1 * | 11/2007 | Yamasaki | ............. G06F 1/3203 713/310 |
| 2009/0237705 | A1 * | 9/2009 | Ikeda | .................. H04L 12/1868 358/1.14 |
| 2013/0166926 | A1 | 6/2013 | Yamamizu | |
| 2015/0062614 | A1 * | 3/2015 | Takatani | ............. G06K 15/408 358/1.14 |
| 2015/0378405 | A1 | 12/2015 | Yamamizu | |

FOREIGN PATENT DOCUMENTS

| JP | 2001-092689 | 4/2001 |
| JP | 2005-219247 | 8/2005 |
| JP | 2005-229210 | 8/2005 |
| JP | 2012-257026 | 12/2012 |

* cited by examiner

*Primary Examiner* — Neil R McLean
(74) *Attorney, Agent, or Firm* — Oblon, McClelland, Maier & Neustadt, L.L.P.

(57) ABSTRACT

An electronic apparatus includes a plurality of processing devices, and a power controller. The power controller is configured to control power supply fed to each of the processing devices. Each of the processing devices includes a detector configured to detect occurrence of an anomaly and a notifier configured to send a notification of the occurrence of the anomaly. Upon receiving the notification from the notifier, the power controller restarts the electronic apparatus by turning off and thereafter turning on the power supply of the plurality of processing devices.

9 Claims, 10 Drawing Sheets

ELECTRONIC APPARATUS, RECOVERY METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2016-045868, filed Mar. 9, 2016. The contents of which are incorporated herein by reference in their entirety.

BACKGROUND OF THE INVENTION

1. Field of the Invention

The present invention generally relates to an electronic apparatus including a plurality of processing devices, a method for recovering the electronic apparatus, and a computer-readable recording medium storing instructions that cause a computer to execute the method.

2. Description of the Related Art

An MFP (Multi-Function Peripheral), which is an electronic apparatus, has a plurality of functions, such as a scanner function, a printing function, and a facsimile (fax) transmission/reception function, and generally includes a plurality of CPUs (central processing units) to implement these functions. For such an apparatus that includes CPUs, a technique that terminates or restarts (reboots) the CPUs when an anomaly, such as a hang, occurs using a watchdog function is known. An example of such a technique is disclosed in Japanese Unexamined Patent Application Publication No. 2012-257026 (Patent Document 1).

The watchdog function is a function for monitoring whether or not a system is operating normally. The hang is a state where software enters an abnormal state and is no longer capable of executing any processing.

However, the conventional technique is disadvantageously incapable of recovering an entire system to its usual service condition. This is because even though a CPU in which the hang has occurred is rebooted, synchronization with the other CPUs cannot be achieved.

SUMMARY OF THE INVENTION

According to one aspect of the present invention, an electronic apparatus includes a plurality of processing devices, and a power controller. The power controller is configured to control power supply fed to each of the processing devices. Each of the processing devices includes a detector configured to detect occurrence of an anomaly and a notifier configured to send a notification of the occurrence of the anomaly. Upon receiving the notification from the notifier, the power controller restarts the electronic apparatus by turning off and thereafter turning on the power supply of the plurality of processing devices.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
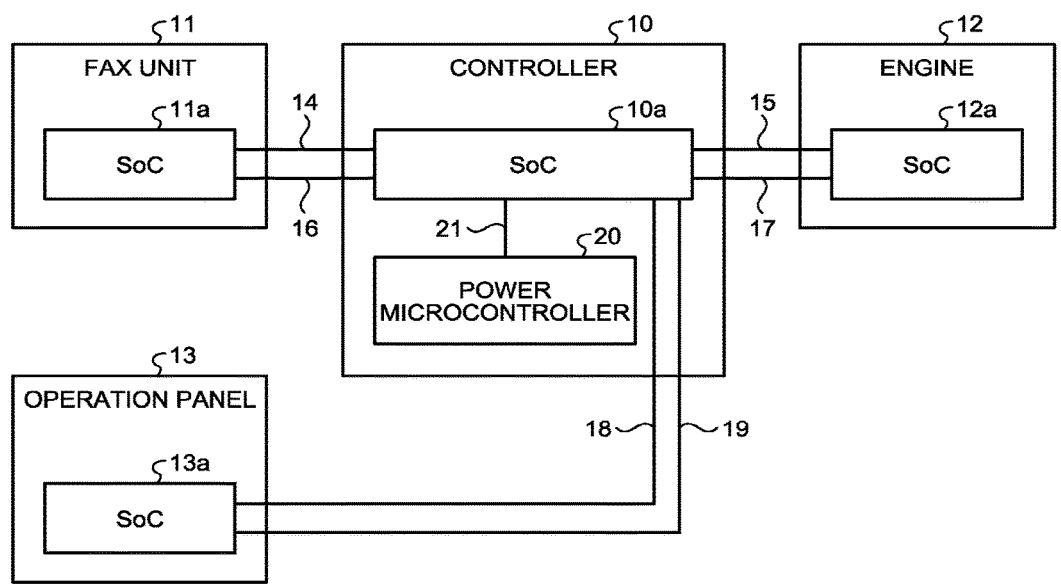
FIG. 1 is a diagram illustrating an example configuration of an image forming apparatus as an electronic apparatus.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an apparatus, a method, and a computer-readable recording medium capable of recovering an entire system even when an anomaly occurs in one of a plurality of processing devices each including a CPU.

FIG. 1 is a diagram illustrating an example configuration of an image forming apparatus as an electronic apparatus. Although the image forming apparatus is taken as an example of "electronic apparatus" in the description below, "electronic apparatus" is not limited to image forming apparatuses. As the image forming apparatus, an MFP having a plurality of functions can be used. The MFP includes a plurality of processing devices including a controller 10, a fax unit 11, an engine 12, and an operation panel 13.

The controller 10, the fax unit 11, and the engine 12 are connected using input/out interfaces 14 and 15 compliant with PCIe (Peripheral Component Interconnect express) or the like and control lines 16 and 17 via GPIO (General Purpose Input/Output) or the like. The controller 10 and the operation panel 13 are connected using an input/out interface 18 via USB (Universal Serial Bus) or the like and a control line 19.

The input/out interfaces 14, 15, and 18 transmit information and data. The control lines 16, 17, and 19 transmit control signals for read, write, and other instructions.

The controller 10 controls operations of the fax unit 11, the engine 12, and the operation panel 13. The fax unit 11 is connected to a telephone line to transmit and receive faxes. The engine 12 includes a scanner engine and a printer engine. The scanner engine reads an image. The printer engine outputs a printout. The operation panel 13 displays information, such as an operating state and a result, and accepts information inputs.

The controller 10, the fax unit 11, the engine 12, and the operation panel 13 include a SoC (System on a Chip) 10a, a SoC 11a, a SoC 12a, and a SoC 13a, respectively, to perform the processing described above. Each of the SoCs 10a to 13a is an integrated circuit where necessary functions are integrated on a single semiconductor chip. In the example illustrated in FIG. 1, the controller 10 includes a power microcontroller 20 for controlling power supply to the controller 10, the fax unit 11, the engine 12, and the operation panel 13; the SoC 10a and the power microcontroller 20 are connected via a control line 21. Although the power microcontroller 20 is included in the controller 10 in this example, the power microcontroller 20 is not necessarily included in the controller 10, and may alternatively be included in another device or provided externally.

Each of the SoCs 10a to 13a has a watchdog function that detects occurrence of an anomaly. Each of the SoCs 10a to 13a detects, using the watchdog function, occurrence of an anomaly, such as a bug (i.e., a defect or an error) of executed software or an executed device driver, a physical memory error, and thermal runaway of the CPU. Each of the SoCs 10a to 13a terminates currently-running software and the like upon detecting an anomaly using the watchdog function, and restarts (reboots) the device where the corresponding one of the SoC 10a to 13a is included. For example, when the SoC 10a of the controller 10 detects an anomaly using the watchdog function the SoC 10a has, the SoC 10a reboots the controller 10.

The power microcontroller 20 can control the power supply to each of the devices. When an anomaly is detected and an instruction to reboot is issued by the SoC 10a of the controller 10, the power microcontroller 20 turns off and thereafter turns on the power supply to the controller 10, thereby rebooting the controller 10.

The MFP can have a power save mode. When a condition for transition to the power save mode is satisfied, the SoC 10a of the controller 10 can instruct the power microcontroller 20 to stop the power supply to the engine and the like to enter the power save mode. Because the power save mode is optional, detailed description thereof is omitted.

When the controller 10 has been rebooted, a notification of having rebooted due to the occurrence of the anomaly is sent to the fax unit 11, the engine 12, and the operation panel 13. The notification is sent to cause these devices to enter a standby-for-reboot state so that these devices can be rebooted simultaneously with the controller 10. At this time, the controller 10 can send a notification instructing the devices to enter the standby state to be ready for restarting.

Upon receiving the notification, the SoCs 11a to 13a of the fax unit 11, the engine 12, and the operation panel 13 terminate every currently-running program instructions (hereinafter, "program") and the like and enter the standby state to be ready for power-supply down. After having entered the standby state, the SoCs 11a to 13a send a notification of being ready for restarting to the controller 10. This notification may be sent via the input/out interfaces 14, 15, and 18; however, because of being merely a notification of completion, the notification can preferably be made using a control signal via the control lines 16, 17, and 19.

Upon receiving the control signal, the SoC 10a of the controller 10 requests the power microcontroller 20 to reboot all the devices via the control line 21. More specifically, the SoC 10a issues a request to perform processing that turns off the power supply to the controller 10, the fax unit 11, the engine 12, and the operation panel 13 and thereafter turns on the same. Upon receiving this request, the power microcontroller 20 turns off and thereafter turns on the power supply of all the devices, thereby rebooting the entire system.

Figure 2:
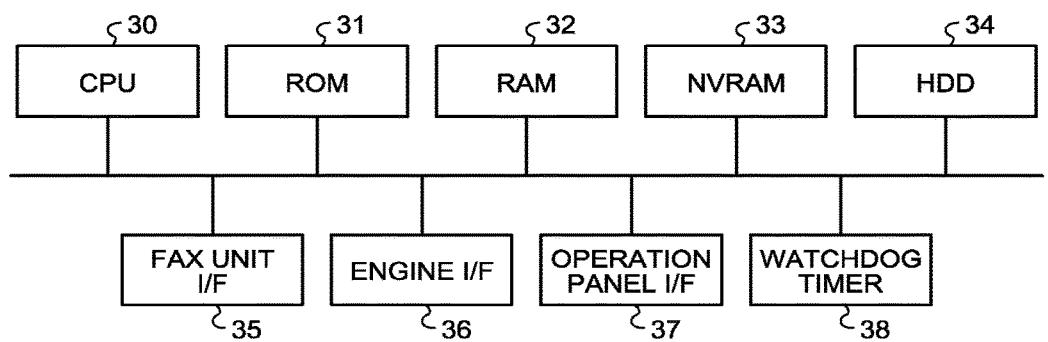
FIG. 2 is a diagram illustrating a hardware architecture of a controller.

A hardware architecture of the SoCs 10a to 13a is described below with reference to FIG. 2. Although being different in the interface to be used, the SoCs 10a to 13a are fundamentally similar in architecture. Accordingly, only the SoC 10a included in the controller 10 will be described below. The SoC 10a includes a CPU 30, a ROM (read only memory) 31, a RAM (random access memory) 32, an NVRAM (non-volatile random access memory) 33, an HDD 34, a fax unit I/F (interface) 35, an engine I/F 36, an operation panel I/F 37, and a watchdog timer 38.

The CPU 30 reads out and executes programs stored in the ROM 31 or the HDD 34. When executing a program, the CPU 30 may use setting information and the like stored in the NVRAM 33 as required. Specifically, the CPU 30 temporarily loads the program, the setting information, and the like into the RAM 32 and executes the program loaded into the RAM 32 using the setting information and the like loaded into the RAM 32. The programs include an OS (operating system), a boot program, firmware, various applications programs (hereinafter, "applications") for implementing respective functions, various drivers, and a program(s) for issuing the notifications and performing the reboot operation.

The RAM 32 provides a workspace for use by the CPU 30 in executing the programs. The RAM 32 is also used as a page memory for generating an image(s) to be printed when printing is performed. The HDD 34 further stores image data representing an image(s) read by the engine 12.

The fax unit I/F 35 is connected to the input/out interface 14 and the control line 16 to transmit fax data, with designation of its destination, to the fax unit 11 and accept received fax data.

The engine I/F 36 is connected to the input/out interface 15 and the control line 17 to send an instruction to read an original document to the engine 12 and accept inputs of scan job information and an image(s) read by the engine 12. The engine I/F 36 also sends a print request including an image(s) to be printed to the engine 12 and accepts print job information.

The operation panel I/F 37 is connected to the input/out interface 18 and the control line 19 to accept information and instructions entered to the operation panel 13. The operation panel I/F 37 also sends information to be displayed to the operation panel 13 and causes the operation panel 13 to display the information. Examples of the information to be displayed include a status of a job being processed and error information.

The watchdog timer 38 causes each currently-running application to transmit a signal to the watchdog timer 38 at predetermined regular intervals and, if there is an application from which the signal is not transmitted even after a lapse of a predetermined period of time, determines that an anomaly has occurred in the application. The watchdog timer 38 interrupts the CPU 30 to issue an instruction to reboot the controller 10 to the CPU 30. Upon receiving this instruction, the CPU 30 instructs the power microcontroller 20 to reboot so that the controller 10 is rebooted.

Figure 3:
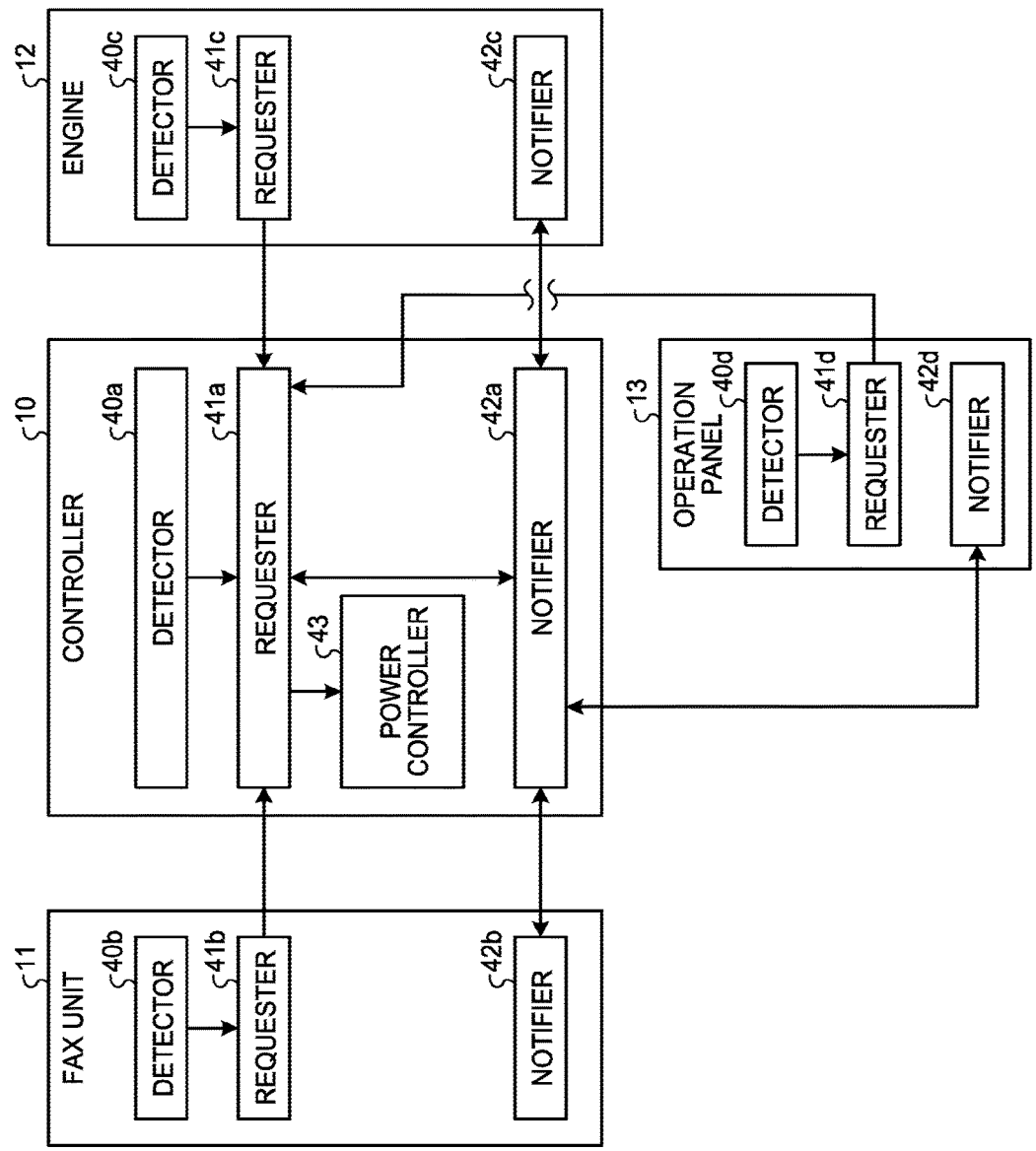
FIG. 3 is a block diagram illustrating a first functional architecture of the image forming apparatus.

The MFP can include such functions as those illustrated in FIG. 3 to enable rebooting all the devices simultaneously. The functions are implemented by functional blocks that are generated by the SoCs 10a to 13a, each included in a corresponding one of the devices, and the power microcontroller 20. The MFP includes the plurality of processing devices including the controller 10, the fax unit 11, the engine 12, and the operation panel 13. Each of the processing devices includes, as the functional blocks, detectors 40a to 40d, requesters 41a to 41d, and notifiers 42a to 42d. The MFP further includes, in one of the plurality of processing devices, a power controller 43. The power controller 43 controls power supply fed to each of the processing devices. In the example illustrated in FIG. 3, the controller 10 includes the power controller 43. Because processing performed by the detectors 40a to 40d, processing performed by the requesters 41a to 41d, and processing performed by the notifiers 42a to 42d are respectively identical, unless otherwise specifically stated, description is made by denoting them as the detectors 40, the requesters 41, and the notifiers 42.

The detector 40 detects occurrence of an anomaly in the processing device to which the detector 40 belongs. The detector 40 can detect occurrence of an anomaly when there is an application from which the signal is not transmitted even after a lapse of the predetermined period of time as described above.

When occurrence of the anomaly is detected by the detector 40, the requester 41 issues a request to reboot the processing device to which the requester 41 belongs. This request is issued to the power controller 43. Upon receiving the request from the requester 41, the power controller 43 reboots the corresponding processing device by turning off and thereafter turning on a switch for the power supply to the processing device. The power controller 43 sends a notification of having rebooted to the notifier 42a of the controller 10.

The notifier 42a sends a notification of the occurrence of the anomaly to all the processing devices, except for the controller 10. The notifier 42a may alternatively send a notification of having rebooted in lieu of the notification of the occurrence of the anomaly.

All the processing devices, except for the controller 10, terminate a currently-running program(s) and the like and enter the standby state to be ready for power-supply down as described above. When the processing devices have become ready for power-supply down, each of the notifiers 42b to 42d notifies the controller 10 of being ready for restarting using a control signal.

Upon receiving this notification from all the processing devices, the requester 41a of the controller 10 requests the power controller 43 to restart the MFP. Upon receiving the request, the power controller 43 turns off and thereafter turns on the power supply fed to all the processing devices including the controller 10, thereby rebooting the entire MFP. Although the requester 41a receives the notifications and requests the power controller 43 to reboot in this example, alternatively, a configuration in which the power controller 43 receives the notifications and reboots the MFP can be employed.

Rebooting the entire MFP enables achieving synchronization among the CPUs, so that the entire system can be recovered to its usual service condition by causing the processing devices to operate with timing adjusted. Because processing to be performed in the rebooting operation after the power supply is turned on is well known processing including executing the boot program and starting the OS, detailed description about the processing is omitted.

Referring to FIG. 3, requests from the requesters 41b to 41d are transmitted to the power controller 43 via the requester 41a; notifications from the notifiers 42b to 42d are transmitted to the requester 41a via the notifier 42a. However, the form of transmitting the requests and the notifications is not limited thereto. Alternatively, the requesters 41b to 41d and the notifiers 42b to 42d may respectively transmit the requests and the notifications directly to the power controller 43 and the requester 41a. A configuration in which each of the requests and the notifications is transmitted to a controller that controls a corresponding one of the devices, and the controller transmits the request and the notification to the power controller 43 and the requester 41a, respectively, may be employed.

Figure 4:
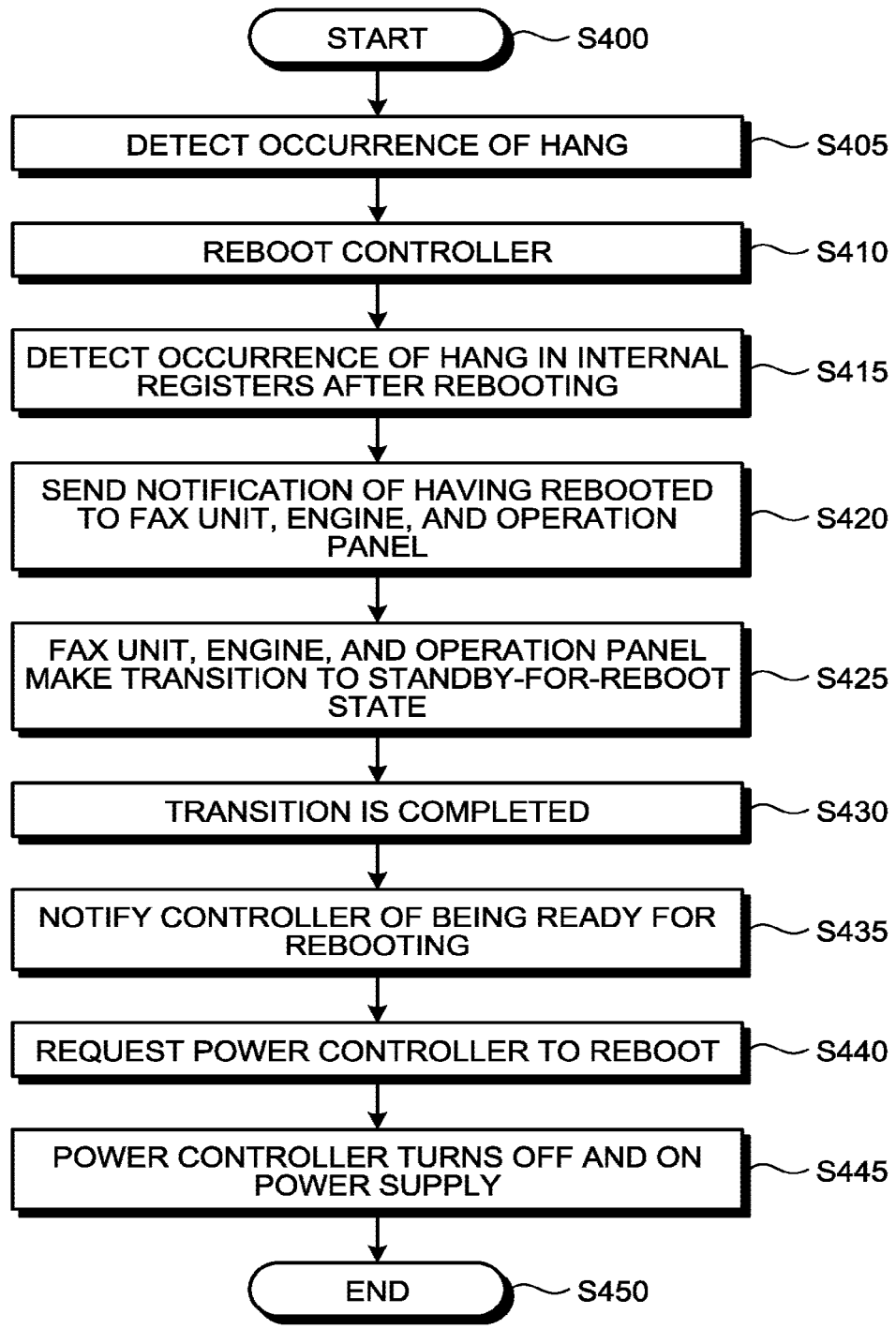
FIG. 4 is a flowchart illustrating a first process flow performed by the image forming apparatus.

Processing that reboots the entire system when a hang occurs as an anomaly in the controller 10 is described below with reference to FIG. 4. Processing starts from S400. At step S405, the detector 40a detects occurrence of the hang. At step S410, the requester 41a requests the power controller 43 to reboot the controller 10. The power controller 43 reboots the controller 10 by turning off and thereafter turning on the power supply to the controller 10. In practice, the power controller 43 reboots the SoC 10a of the controller 10.

At step S415, after the rebooting, the controller 10 detects occurrence of a hang in internal registers included in the CPU. At step S420, the notifier 42a sends a notification of having rebooted to the fax unit 11, the engine 12, and the operation panel 13.

At step S425, the fax unit 11, the engine 12, and the operation panel 13 make transition to the standby-for-reboot state. Specifically, as described above, the fax unit 11, the engine 12, and the operation panel 13 terminate a currently-running program(s) and the like and make transition to the standby state to be ready for power-supply down. After the transition is completed to be ready for rebooting at step S430, the notifiers 42b to 42d notify the controller 10 of being ready for rebooting using a control signal at step S435.

The requester 41a of the controller 10 requests the power controller 43 to reboot the MFP at step S440. At step S445, the power controller 43 reboots the MFP by turning off and thereafter turning on the power supply of the entire MFP. At step S450, processing ends. Specifically, the power controller 43 reboots the entire system by temporarily turning off and thereafter turning on the power supply to the controller 10, the fax unit 11, the engine 12, and the operation panel 13.

Figure 5:
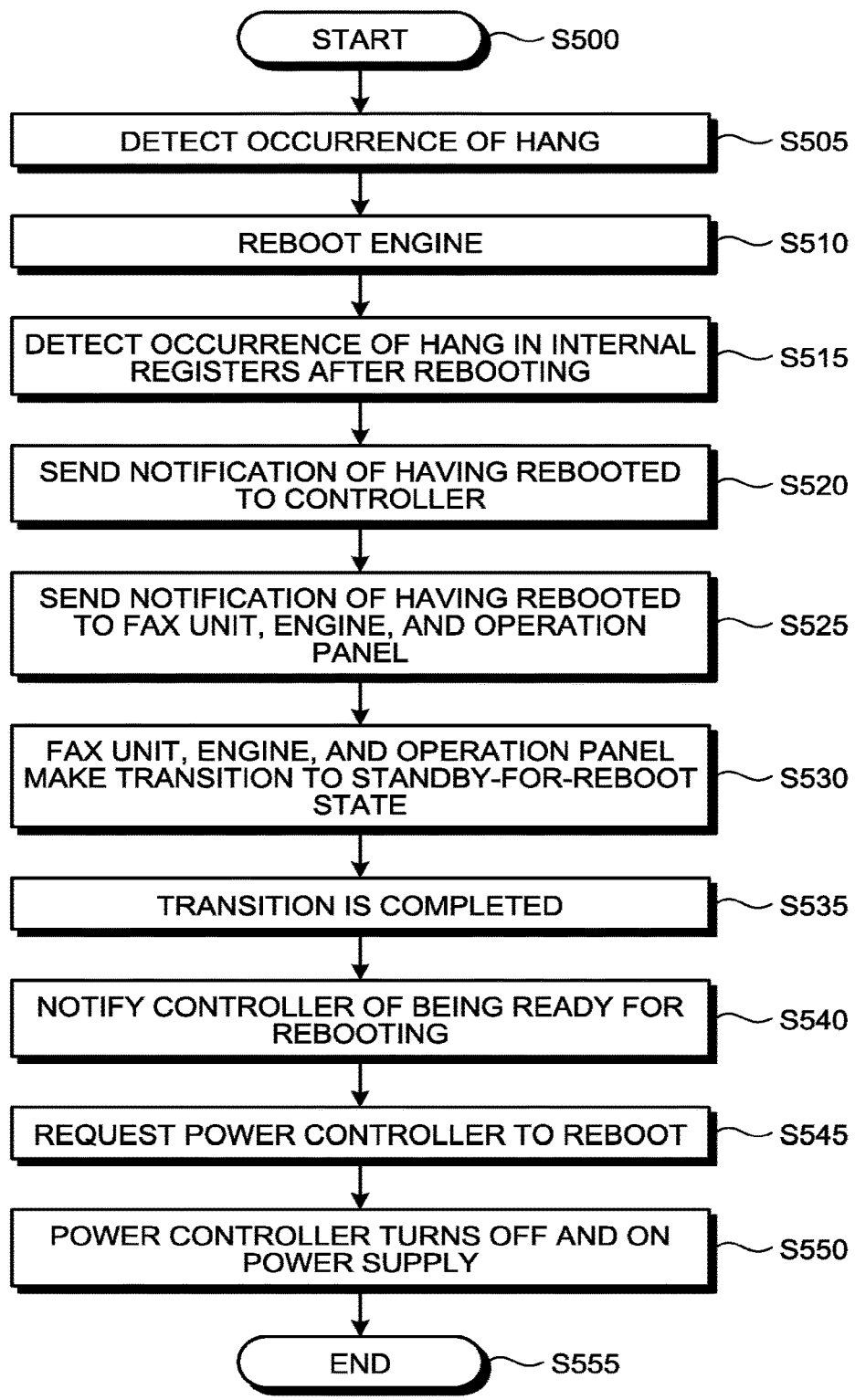
FIG. 5 is a flowchart illustrating a second process flow performed by the image forming apparatus.

Processing to be performed when a hang occurs in the controller 10 has been described above with reference to FIG. 4. Processing to be performed when a hang occurs in any one of the fax unit 11, the engine 12, and the operation panel 13 is described below with reference to FIG. 5. Because similar processing is to be performed irrespective of in which one the fax unit 11, the engine 12, and the operation panel 13 a hang has occurred, processing performed when a hang occurs in the engine 12 is described below.

Processing starts from step S500. At step S505, the detector 40c of the engine 12 detects occurrence of a hang. At step S510, the requester 41c requests the power controller 43 to reboot the engine 12. The power controller 43 reboots the engine 12 by turning off and thereafter turning on the power supply to the engine 12. In practice, the power controller 43 reboots the SoC 12a of the engine 12.

At step S515, after the rebooting, the engine 12 detects occurrence of a hang in internal registers included in the CPU. At step S520, the notifier 42c notifies the controller 10 of having rebooted using a control signal.

At step S525, the notifier 42a of the controller 10 sends a notification of having rebooted to the fax unit 11, the engine 12, and the operation panel 13.

At step S530, the fax unit 11, the engine 12, and the operation panel 13 make transition to the standby-for-reboot state. Specifically, as described above, the fax unit 11, the engine 12, and the operation panel 13 terminate a currently-running program(s) and the like and make transition to the standby state to be ready for power-supply down. After the transition is completed to be ready for rebooting at step S535, the notifiers 42b to 42d notify the controller 10 of being ready for rebooting using a control signal at step S540.

At step S545, the requester 41a of the controller 10 requests the power controller 43 to reboot the MFP. At S550, the power controller 43 reboots the MFP by turning off and thereafter turning on the power supply of the entire MFP. At step S555, processing ends. As in the above-described example, the power controller 43 reboots the entire system by temporarily turning off and thereafter turning on the power supply to the controller 10, the fax unit 11, the engine 12, and the operation panel 13.

Referring to the functional blocks illustrated in FIG. 3, the controller 10 includes the detector 40a, the requester 41a, the notifier 42a, and the power controller 43. In the example illustrated in FIG. 6, the controller 10 further includes a storage 44. Because the detector 40 and the like have already been described, only the storage 44 is described below.

The storage 44 stores occurrence of a hang as historical information referred to as occurrence history. A nonvolatile memory that retains information even after power is removed may preferably be used as the storage 44. The occurrence history may be only date and time of occurrence and the time of occurrence so long as the occurrence of the hang can be known from the occurrence history. Furthermore, a cause and the like of the hang may be stored as the history. The detector 40 may preferably acquire these information pieces from the internal registers and store the information in the storage 44. An acquirer that acquires and stores the information pieces may be additionally provided.

Figure 6:
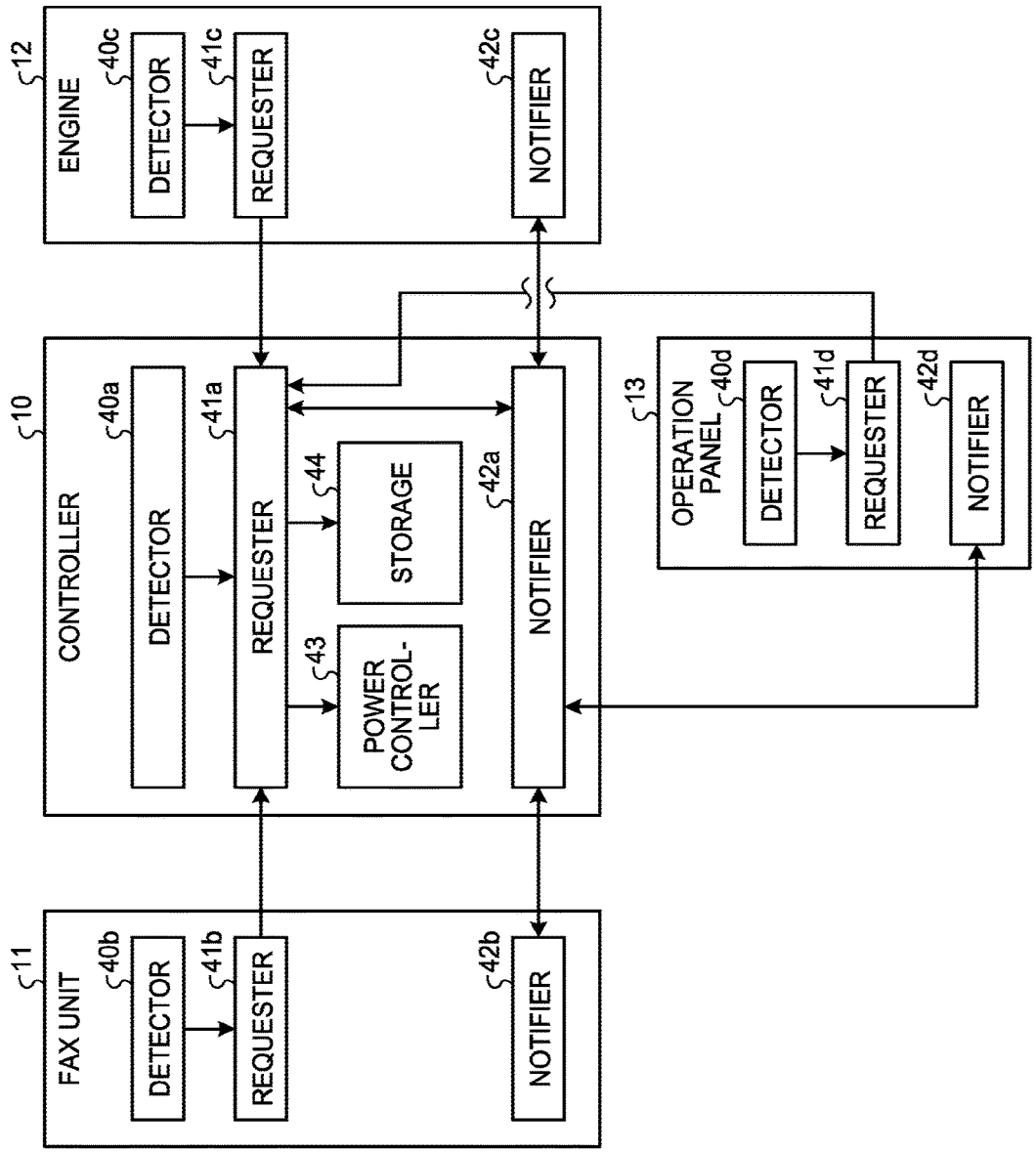
FIG. 6 is a block diagram illustrating a second functional architecture of the image forming apparatus.
Figure 7:
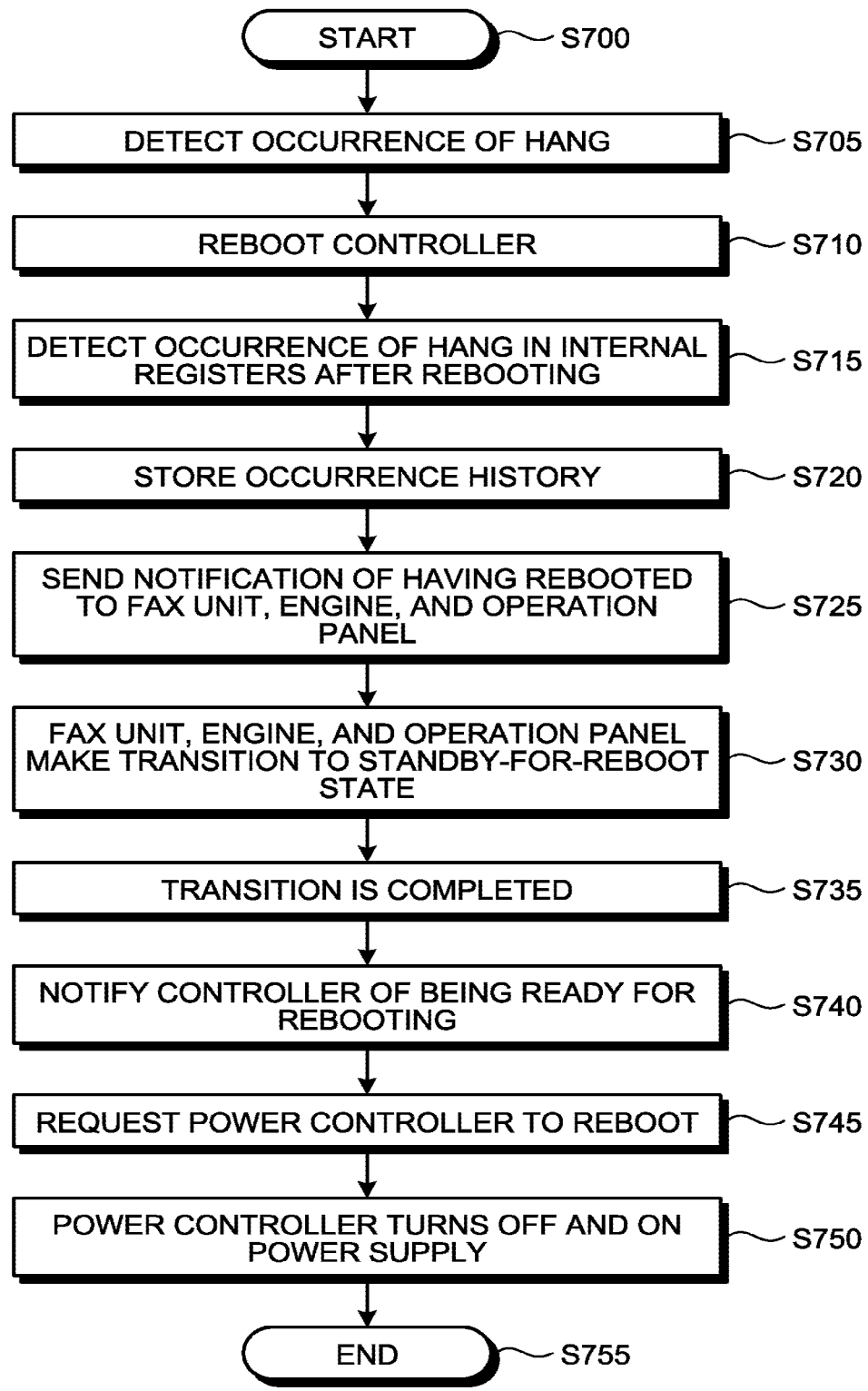
FIG. 7 is a flowchart illustrating a third process flow performed by the image forming apparatus.

Processing to be performed by the MFP including the functional blocks illustrated in FIG. 6 is described below with reference to FIG. 7. Processing starts from step S700. At step S705, the detector 40a of the controller 10 detects occurrence of a hang. At step S710, the requester 41a requests the power controller 43 to reboot the controller 10. The power controller 43 reboots the controller 10 by turning off and thereafter turning on the power supply to the controller 10.

At step S715, after the rebooting, the detector 40a of the controller 10 detects occurrence of a hang in the internal registers included in the CPU. At step S720, the detector 40a causes occurrence history of the hang to be stored in the storage 44. At step S725, the notifier 42a sends a notification of having rebooted to the fax unit 11, the engine 12, and the operation panel 13. Subsequent processing is similar to processing to be performed at step S425 and its following steps of FIG. 4 or step S530 and its following steps of FIG. 5.

Figure 8:
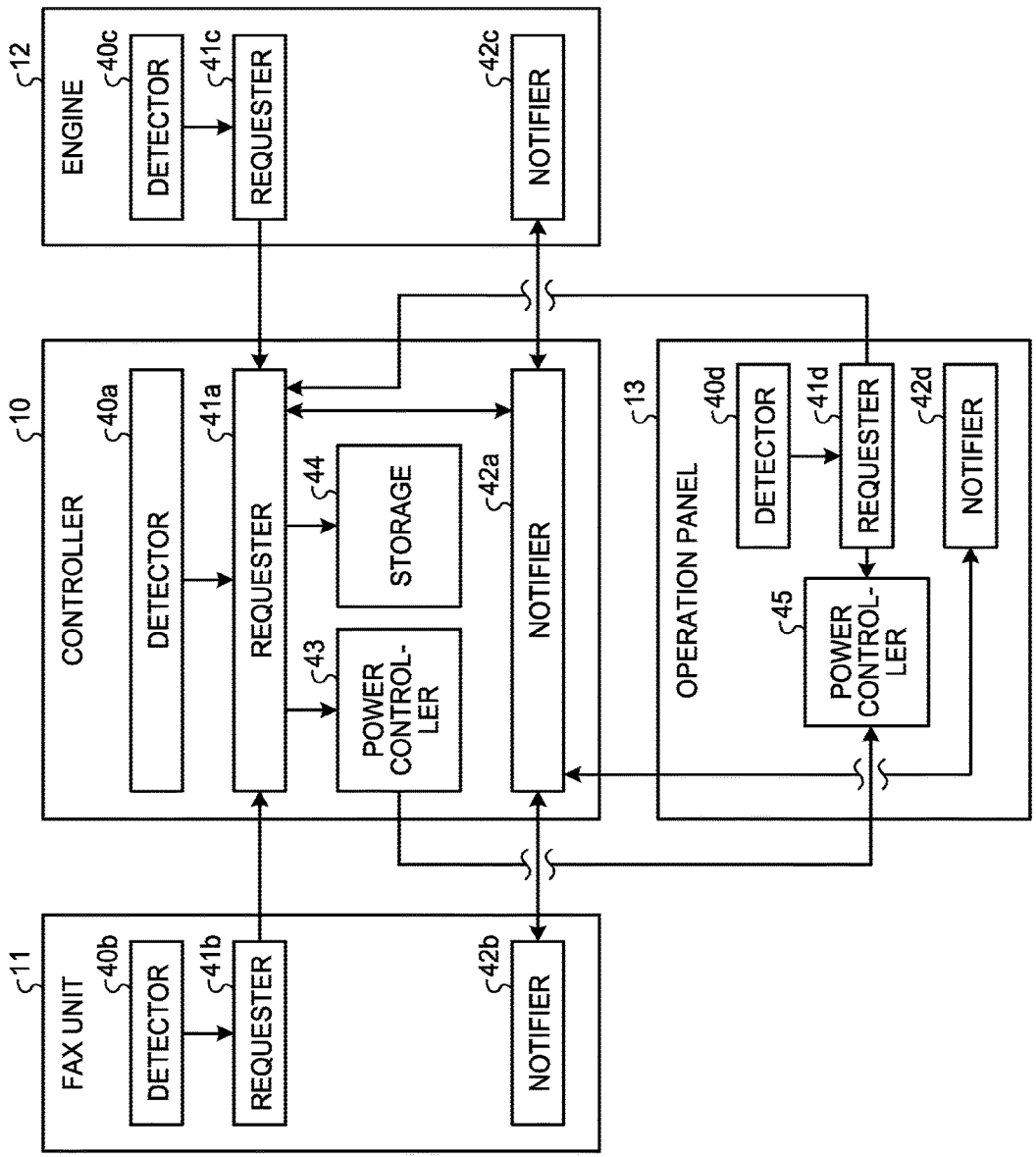
FIG. 8 is a block diagram illustrating a third functional architecture of the image forming apparatus.

In the examples described above, the power controller 43 is included in any one of the plurality of processing devices and reboots all of the plurality of processing devices simultaneously. Alternatively, a configuration in which the power controller 43 excludes a specific processing device(s) from devices to be rebooted and controls power supply of the excluded processing device(s) independently may be employed. An example of this configuration is illustrated in FIG. 8. Referring to the example illustrated in FIG. 8, the operation panel 13 includes a power controller 45 that controls the power supply fed to the operation panel 13. Because the functional blocks, except for the power controller 45, have already been described with reference to FIG. 3 and FIG. 6, repeated description is omitted.

As is the power controller 43, the power controller 45 is implemented by a power microcontroller. The power controllers are connected via a control line. Accordingly, the power controller 45 that receives an instruction to turn off and thereafter turn on the power supply to the operation panel 13 from the power controller 43 can cause the operation panel 13 to enter an STR (Suspend To RAM) (power saving state) where only a screen is switched off, rather than turning off the power supply of the entire operation panel 13.

Hence, the operation panel 13 can be operated asynchronously from the other processing devices. Furthermore, by causing the operation panel 13 to enter the power saving state rather than rebooting the operation panel 13, time taken for startup can be reduced.

Figure 9:
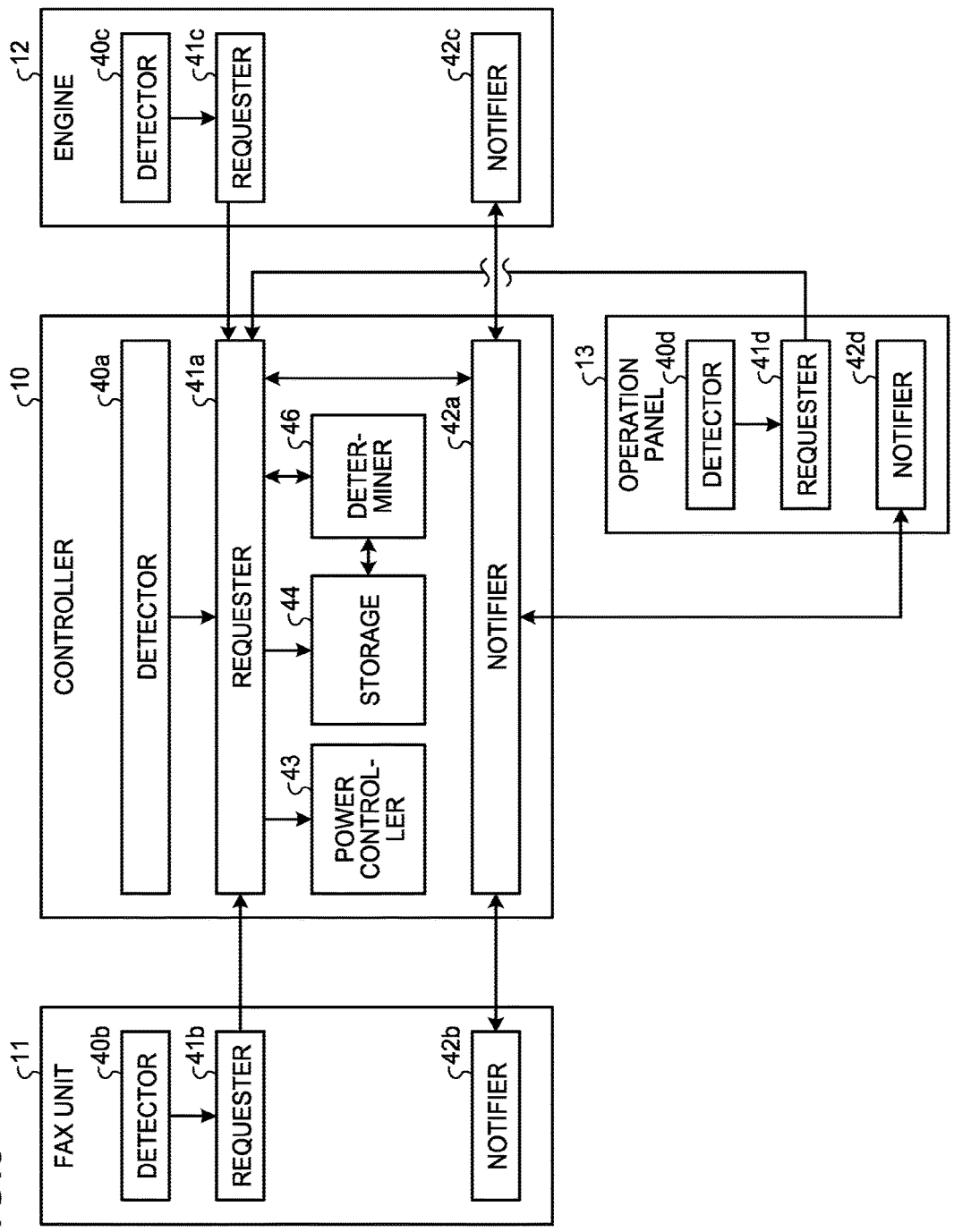
FIG. 9 is a block diagram illustrating a fourth functional architecture of the image forming apparatus.

Determination as to whether or not to reboot the MFP can be made based on the occurrence history stored in the storage 44. To implement this, each of the processing devices or a processing device including the power controller 43 may preferably include a determiner 46. In the example illustrated in FIG. 9, the controller 10 includes the determiner 46. Because the functional blocks, except for the determiner 46, have already been described with reference to FIG. 3 and FIG. 6, only the determiner 46 is described below.

The determiner 46 determines whether or not to reboot the MFP depending on whether or not hangs have occurred within a predetermined period of time using the occurrence history stored in the storage 44. More specifically, the determiner 46 determines whether hangs have occurred in the controller 10 within one hour, for example. When hangs occur at such short time intervals, the hangs are highly possibly a regular anomaly. For this reason, the determiner 46 requests the operation panel 13 to display an error indication or the like, so that the operation panel 13 displays the error indication or the like to notify a user thereof.

Figure 10:
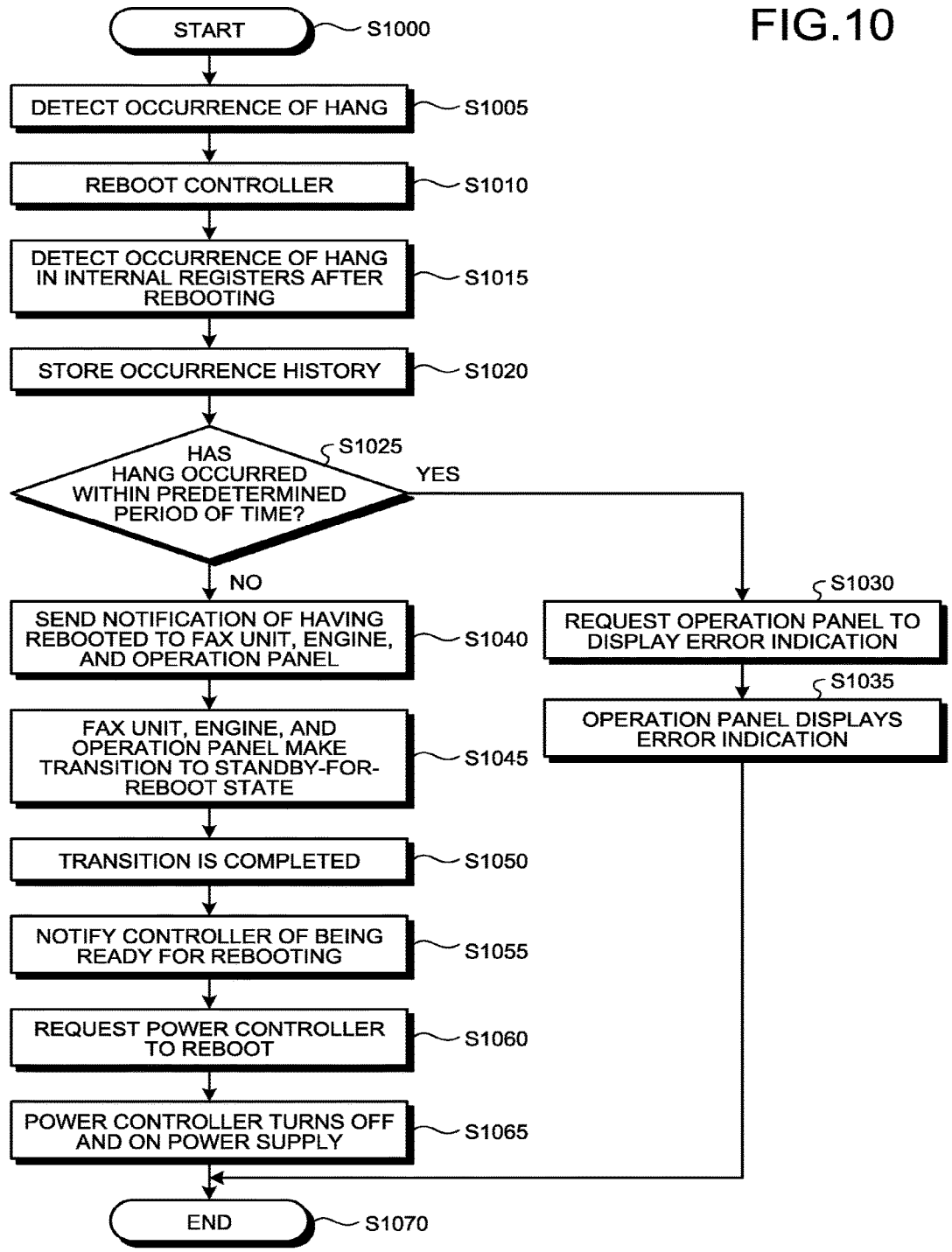
FIG. 10 is a flowchart illustrating a fourth process flow performed by the image forming apparatus.

Processing to be performed to implement the above is described below with reference to FIG. 10. Processing starts from step S1000. At 51005, the detector 40a of the controller 10 detects occurrence of a hang. At step S1010, the requester 41a requests the power controller 43 to reboot the controller 10. The power controller 43 reboots the controller 10 by turning off and thereafter turning on the power supply to the controller 10.

At step S1015, after the rebooting, the detector 40a of the controller 10 detects occurrence of a hang in the internal registers included in the CPU. At step S1020, the detector 40a causes occurrence history of the hang to be stored in the storage 44. At step S1025, the determiner 46 determines whether hangs have occurred in the controller 10 within a predetermined period of time. When hangs have occurred within the predetermined period of time, processing proceeds to step S1030 where the determiner 46 requests the operation panel 13 to display an error indication. At step S1035, the operation panel 13 displays the error indication.

On the other hand, when hangs have not occurred within the predetermined period of time, processing proceeds to step S1040 where the notifier 42a sends a notification of having rebooted to the fax unit 11, the engine 12, and the operation panel 13. Processing similar to that illustrated in FIG. 7 is performed at 51045 and its following steps. Processing ends at step S1070.

In the above-described examples, the OS and applications that are necessary to cause the controller 10, the fax unit 11, the engine 12, and the operation panel 13 to operate appropriately are started up by the rebooting operation. A PC (personal computer) generally implements what is generally referred to as a safe mode where the PC is started up with functions limited to its minimum and performs self-analysis and automatic recovery. Similarly, the MFP can be started up in a safe mode upon occurrence of a hang.

The controller 10 can include a start-up controller that controls start-up of the controller 10. At start-up during rebooting, the power controller 43 can send a notification instructing to start up the controller 10 only with a specified operation. Upon receiving the notification, the start-up controller can start up the controller 10 only with the specified operation. Hence, the power controller 43 can send a notification instructing to start up the controller 10 in, for example, the safe mode and, in response thereto, the controller 10 can be started up in the safe mode.

After the start-up, a user can cause the MFP to perform self-analysis and automatic recovery. The self-analysis can be performed using a known self-analysis program. The automatic recovery can be performed using a known automatic recovery program. After starting up the MFP in the safe mode and causing the MFP to perform the automatic recovery in this manner, the entire MFP can be rebooted again.

According to an aspect of the present invention, even when an anomaly occurs in one of a plurality of processing devices of a system, the entire system can be recovered.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An electronic apparatus, comprising:
a plurality of processing devices; and
power control circuitry configured to control power supplied to each of the processing devices, wherein
each of the processing devices is configured to detect occurrence of an anomaly and transmit a notification of the occurrence of the anomaly,
upon receiving the notification, the power control circuitry is configured to restart the electronic apparatus by turning off and thereafter turning on the power supplied to the plurality of processing devices,
the power control circuitry is included in a first processing device that is one of the plurality of processing devices,
the first processing device is configured to transmit the notification of the occurrence of the anomaly to each of the processing devices except for the first processing device,
each of the processing devices except for the first processing device is configured to transmit a notification of being ready for restarting, and
upon receiving the notification of being ready for restarting from each of the processing devices, the power control circuitry is configured to restart the electronic apparatus.

2. The electronic apparatus according to claim 1, further comprising a non-transitory memory to store the occurrence of each detected anomaly and each notification as an occurrence history.

3. The electronic apparatus according to claim 2, wherein the power control circuitry is further configured to determine whether to restart the electronic apparatus based on the occurrence history stored in the memory.

4. The electronic apparatus according to claim 3, wherein the power control circuitry is further configured to determine whether to restart the electronic apparatus depending on whether a single anomaly has occurred a plurality of times within a predetermined period of time by using the occurrence history stored in the memory.

5. The electronic apparatus according to claim 1, further comprising second power control circuitry configured to control power supplied to a second processing device that is one of the plurality of processing devices, wherein
the power control circuitry is configured to restart the electronic apparatus by turning off and thereafter turning on the power supplied to each of the plurality of processing devices except for the second processing device.

6. The electronic apparatus according to claim 1, wherein a first processing device that is one of the plurality of processing devices includes the power control circuitry and a start-up controller configured to control start-up of the first processing device, and
when starting up the electronic apparatus, the power control circuitry instructs the start-up controller included in the first processing device to start up the first processing device only with a specified operation.

7. The electronic apparatus according to claim 1, wherein the electronic apparatus is an image forming apparatus that includes, as the plurality of processing devices, a facsimile device, an engine configured to perform image reading and printing, an operation panel configured to accept information input and display information, and a controller configured to control the facsimile device, the engine, and the operation panel.

8. A recovery method of recovering an electronic apparatus including a plurality of processing devices, the recovery method comprising:

detecting occurrence of an anomaly in one of the plurality of processing devices;

sending a notification of the detected occurrence of the anomaly; and restarting, by power control circuitry configured to control power supplied to each of the plurality of processing devices included in the electronic apparatus, the electronic apparatus by turning off and thereafter turning on the power supplied to the plurality of processing devices in response to the notification, wherein the power control circuitry is included in a first processing device that is one of the plurality of processing devices, the sending step includes transmitting, by the first processing device, the notification of the occurrence of the anomaly to each of the processing devices except for the first processing device, the method further includes transmitting, by each of the processing devices except for the first processing device, a notification of being ready for restarting, and the restarting step includes, upon receiving the notification of being ready for restarting from each of the processing devices, restarting the electronic apparatus.

9. A non-transitory computer-readable recording medium with an executable program stored thereon, wherein the program instructs a computer to perform the recovery method according to claim 8.

* * * * *